(12) United States Patent
Mazzagatti et al.

(10) Patent No.: US 7,689,571 B1
(45) Date of Patent: Mar. 30, 2010

(54) OPTIMIZING THE SIZE OF AN INTERLOCKING TREE DATASTORE STRUCTURE FOR KSTORE

(75) Inventors: Jane Campbell Mazzagatti, Blue Bell, PA (US); Timothy William Collins, Lansdowne, PA (US); Steven L. Rajcan, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 111 days.

(21) Appl. No.: 11/388,740

(22) Filed: Mar. 24, 2006

(51) Int. Cl.
*G06F 17/00* (2006.01)
*G06F 17/30* (2006.01)

(52) U.S. Cl. ........................ 707/100; 707/203

(58) Field of Classification Search ............... 707/1–10, 707/100–104.1
See application file for complete search history.

(56) References Cited

U.S. PATENT DOCUMENTS

| | | | |
|---|---|---|---|
| 4,286,330 A | 8/1981 | Isaacson | |
| 5,245,337 A | 9/1993 | Bugajski | |
| 5,293,164 A | 3/1994 | Bugajski | |
| 5,592,667 A | 1/1997 | Bugajski | |
| 5,630,125 A | 5/1997 | Zellweger | |
| 5,634,133 A | 5/1997 | Kelley | |
| 5,829,004 A | 10/1998 | Au | |
| 5,894,311 A | 4/1999 | Jackson | |
| 5,918,229 A | 6/1999 | Davis et al. | |
| 5,930,805 A | 7/1999 | Marquis | |
| 5,963,965 A | 10/1999 | Vogel | |
| 5,966,709 A | 10/1999 | Zhang | |
| 5,970,490 A | 10/1999 | Morgenstern | |
| 5,978,794 A | 11/1999 | Agrawal et al. | |
| 5,983,232 A | 11/1999 | Zhang | |

(Continued)

FOREIGN PATENT DOCUMENTS

EP 0 079 465 1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Hosain T Alam
*Assistant Examiner*—Navneet K Ahluwalia
(74) *Attorney, Agent, or Firm*—Richard J. Gregson; Robert P. Marley

(57) ABSTRACT

A method for optimizing the construction of a KStore includes providing a data set having a plurality of records with a plurality of fields, providing an optimization structure from a sample of the data set and analyzing the optimization structure to determine a field order for the records contained in the data set. A KStore is provided from the data set in accordance with the field order. The sample of the data set can include the entire data set, a random sample of the data set or a predetermined number of records from the data set. The data set has an initial order having earlier records and later records and the sample can include a plurality of the earlier records. The sample of the data set includes a user determined number of records from the data set. The optimization structure can be a KStore.

6 Claims, 4 Drawing Sheets

U.S. PATENT DOCUMENTS

| | | | |
|---|---|---|---|
| 6,018,734 A | 1/2000 | Zhang | |
| 6,029,170 A | 2/2000 | Garger | |
| 6,031,993 A | 2/2000 | Andrews et al. | |
| 6,102,958 A | 8/2000 | Meystel | |
| 6,115,715 A | 9/2000 | Traversat et al. | |
| 6,138,115 A | 10/2000 | Agrawal et al. | |
| 6,138,117 A | 10/2000 | Bayardo | |
| 6,144,962 A | 11/2000 | Weinberg et al. | |
| 6,160,549 A | 12/2000 | Touma et al. | |
| 6,233,575 B1 | 5/2001 | Agrawal et al. | |
| 6,275,817 B1 | 8/2001 | Reed et al. | |
| 6,278,987 B1 | 8/2001 | Reed et al. | |
| 6,286,002 B1 | 9/2001 | Axaopoulos et al. | |
| 6,341,281 B1 | 1/2002 | MacNicol et al. | |
| 6,356,902 B1 | 3/2002 | Tan et al. | |
| 6,360,224 B1 | 3/2002 | Chickering | |
| 6,373,484 B1 | 4/2002 | Orell et al. | |
| 6,381,600 B1 | 4/2002 | Lau | |
| 6,389,406 B1 | 5/2002 | Reed et al. | |
| 6,394,263 B1 | 5/2002 | McCrory | |
| 6,453,314 B1 | 9/2002 | Chan et al. | |
| 6,470,277 B1 | 10/2002 | Chin et al. | |
| 6,470,344 B1 | 10/2002 | Kothuri et al. | |
| 6,473,757 B1 | 10/2002 | Garofalakis et al. | |
| 6,477,683 B1 | 11/2002 | Killian et al. | |
| 6,499,026 B1 | 12/2002 | Rivette et al. | |
| 6,505,184 B1 | 1/2003 | Reed et al. | |
| 6,505,205 B1 | 1/2003 | Kothuri et al. | |
| 6,581,063 B1 | 6/2003 | Kirkman | |
| 6,591,272 B1 | 7/2003 | Williams | |
| 6,604,114 B1 | 8/2003 | Toong et al. | |
| 6,615,202 B1 | 9/2003 | Ding et al. | |
| 6,624,762 B1 | 9/2003 | End, III | |
| 6,635,089 B1 | 10/2003 | Burkett et al. | |
| 6,662,185 B1 | 12/2003 | Stark et al. | |
| 6,681,225 B1 | 1/2004 | Uceda-Sosa et al. | |
| 6,684,207 B1 | 1/2004 | Greenfield et al. | |
| 6,691,109 B2 | 2/2004 | Bjornson et al. | |
| 6,704,729 B1 | 3/2004 | Klein et al. | |
| 6,711,585 B1 | 3/2004 | Copperman et al. | |
| 6,745,194 B2 | 6/2004 | Burrows | |
| 6,748,378 B1 | 6/2004 | Lavender et al. | |
| 6,751,622 B1 | 6/2004 | Puri et al. | |
| 6,760,720 B1 | 7/2004 | De Bellis | |
| 6,768,995 B2 | 7/2004 | Their et al. | |
| 6,769,124 B1 | 7/2004 | Schoening et al. | |
| 6,799,184 B2 | 9/2004 | Bhatt et al. | |
| 6,804,688 B2 | 10/2004 | Kobayashi et al. | |
| 6,807,541 B2 | 10/2004 | Bender et al. | |
| 6,816,856 B2 | 11/2004 | Baskins et al. | |
| 6,826,556 B1 | 11/2004 | Miller et al. | |
| 6,831,668 B2 | 12/2004 | Cras et al. | |
| 6,868,414 B2 | 3/2005 | Khanna et al. | |
| 6,900,807 B1 | 5/2005 | Liongosari et al. | |
| 6,920,608 B1 | 7/2005 | Davis | |
| 6,931,401 B2 | 8/2005 | Gibson et al. | |
| 6,952,736 B1 | 10/2005 | Westbrook | |
| 6,965,892 B1 | 11/2005 | Uceda-Sosa et al. | |
| 7,027,052 B1 | 4/2006 | Thorn et al. | |
| 7,130,859 B2 | 10/2006 | Kobayashi | 707/102 |
| 7,228,296 B2 | 6/2007 | Matsude | |
| 2001/0010048 A1 | 7/2001 | Kobayashi | 707/2 |
| 2002/0124003 A1 | 9/2002 | Rajasekaran et al. | |
| 2002/0138353 A1 | 9/2002 | Schreiber et al. | |
| 2002/0143735 A1 | 10/2002 | Ayi et al. | |
| 2002/0143783 A1 | 10/2002 | Bakalash et al. | |
| 2002/0188613 A1 | 12/2002 | Chakraborty et al. | |
| 2002/0194173 A1 | 12/2002 | Bjornson et al. | |
| 2003/0009443 A1 | 1/2003 | Yatviskly | |
| 2003/0033279 A1 | 2/2003 | Gibson et al. | |
| 2003/0093424 A1 | 5/2003 | Chun et al. | |
| 2003/0115176 A1 | 6/2003 | Bobroff et al. | |
| 2003/0120651 A1 | 6/2003 | Bernstein | |
| 2003/0204513 A1 | 10/2003 | Bumbulis | |
| 2003/0204515 A1 | 10/2003 | Shadmon et al. | |
| 2003/0217335 A1 | 11/2003 | Chung et al. | |
| 2004/0107186 A1 | 6/2004 | Najork et al. | |
| 2004/0133590 A1 | 7/2004 | Henderson et al. | |
| 2004/0143571 A1 | 7/2004 | Bjornson et al. | |
| 2004/0169654 A1 | 9/2004 | Walker et al. | |
| 2004/0230560 A1 | 11/2004 | Elza et al. | |
| 2004/0249781 A1 | 12/2004 | Anderson | |
| 2005/0015383 A1 | 1/2005 | Harjanto | |
| 2005/0050054 A1 | 3/2005 | Clark et al. | |
| 2005/0060325 A1 | 3/2005 | Bakalash et al. | |
| 2005/0071370 A1 | 3/2005 | Altschul et al. | |
| 2005/0080800 A1 | 4/2005 | Parupudi et al. | |
| 2005/0097108 A1 | 5/2005 | Wang et al. | |
| 2005/0102294 A1 | 5/2005 | Coldewey | |
| 2005/0149503 A1 | 7/2005 | Raghavachari | |
| 2005/0171960 A1 | 8/2005 | Lomet | |
| 2005/0179684 A1 | 8/2005 | Wallace | |
| 2005/0198042 A1 | 9/2005 | Russell et al. | |
| 2005/0262108 A1 | 11/2005 | Gupta | |
| 2006/0101048 A1* | 5/2006 | Mazzagatti et al. | 707/101 |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al: "Multiple Generation Text Files Using Overlapping Tree Structures", Computer Journal, Oxford University Press, Surrey, GB, vol. 28, No. 4 Aug. 1985, pp. 414-416.

* cited by examiner

Sample Data Set – Sales Activities

Invoice123 Tuesday Bill NJ TV $125
Invoice124 Tuesday Bill NJ TV $520
Invoice125 Tuesday Bill NJ TV $1700
Invoice126 Tuesday Bill NJ TV $125
Invoice127 Tuesday Bill NJ TV $125

Figure 2

OPTIMIZING THE SIZE OF AN INTERLOCKING TREE DATASTORE STRUCTURE FOR KSTORE

BACKGROUND OF THE INVENTION

1. Field of Invention

This invention relates to computing and in particular to the field of optimizing the building of KStore interlocking trees data structures.

2. Description of Related Art

The process of optimizing data structures and methods for accomplishing such is fairly common in the art. For example, U.S. Pat. No. 6,141,655, entitled "Method and apparatus for optimizing and structuring data by designing a cube forest data structure for hierarchically split cube forest template" teaches a method to structure data that enables quick searching for particular aggregates and the compact storage of this data within a multidimensional database (MDB). U.S. Pat. No. 6,470,335 entitled "System and method for optimizing the structure and display of complex data filters teaches a system and method for optimizing the structure and visual display of complex data filters that are used to query a relational database.

U.S. Patent Application No. 20040103081, entitled "Method and system for optimizing data searches in tree structures" teaches a method for optimizing data searches in tree structures by organizing multiple search levels of data into sub-trees contained in fixed size blocks of shared external memory of an embedded processing system, and requiring each reference to the data to proceed from one-half of a sub-tree during a descent of the search tree based on a search pattern.

There are several limitations with the above methods of optimization and compression. While all of the examples deal with some form of data optimization, they all relate to schemes useful in optimizing the structure of data and queries in traditional relational databases.

All references cited herein are incorporated herein by reference in their entireties.

BRIEF SUMMARY OF THE INVENTION

A method for optimizing the construction of a KStore includes providing a data set having a plurality of records with a plurality of fields, providing an optimization structure from a sample of the data set and analyzing the optimization structure to determine a field order for the records contained in the data set. A KStore is provided from the data set in accordance with the field order. The sample of the data set can include the entire data set, a random sample of the data set or a predetermined number of records from the data set. The data set has an initial order having earlier records and later records and the sample can include a plurality of the earlier records. The sample of the data set includes a user determined number of records from the data set. The optimization structure can be a KStore. The analyzing of the optimization structure includes obtaining analysis data from the optimization structure. The method includes querying the optimization structure to determine a number of record fields. The optimization structure is queried to determine a number of unique variables in a record field. A data structure is provided to contain the analysis data and the number of fields within a record in the data structure is recorded. The data structure can contain the analysis data a field name can be recorded in the data structure. A variable in the data structure is representative of a number of differing field values in a field. A plurality of variables is recorded in the data structure each variable of the plurality of variables being representative of a number of differing field values in a respective field of the plurality of fields.

Our solution overcomes the inherent limitations associated with the prior art of optimization through compression that use traditional relational databases, by using a method that was specifically invented for use in KStore interlocking trees datastores.

We have developed a system and various methods for creating and using interlocking trees datastores and various features of said interlocking trees datastores. We refer to an instantiation of these interlocking trees datastores that we have developed as a "KStore" or just "K". In particular, these structures and methods have been described in patent applications U.S. Ser. Nos. 10/385,421, (now published as US 20040181547 A1) and 10/666,382, by inventor Mazzagatti. Additionally, we described a system in which such interlocking trees datastores could more effectively be used in U.S. Ser. No. 10/879,329. We hereby incorporate these referenced patent documents in their respective entireties into this patent by this reference. While the system and method we describe in this patent relate with particularity to the specific interlocking trees datastores which inventor Mazzagatti hereof described in the above-referenced patent (applications), it should be readily apparent that the system and methods described herein may also be applicable to similar structures.

The invention described herein below relates to interlocking trees datastores having a structure that has been described in prior patent applications and may be readily used by and adapted to devices described in patent application Ser. No. 10/759,466 (now published as 20050165749) and Ser. No. 10/879,329, which themselves are for use with such interlocking trees datastores, which are hereby incorporated by this reference in their respective entireties.

As explained in the above mentioned patents, a KStore data store may be built within the memory of a computer system or computer systems. Depending on the amount of data being loaded, the KStore data store may be quite large, and thus, the amount of computer memory used may be quite large as well. This invention provides a method to reduce the size requirements associated with a large K by optimizing how the data is loaded and how the data store is built. In this invention an initial K may be used to record and evaluate the relationships of the incoming data and calculate a more efficient order for the data. The new data order may then be used to learn the entire data set, with the result that the required space to hold a K may be decreased.

BRIEF DESCRIPTION OF SEVERAL VIEWS OF THE DRAWINGS

The invention will be described in conjunction with the following drawings in which like reference numerals designate like elements and wherein:

FIG. 2 is a table of records for sales activities from a fictional organization useful for heuristic purposes.

DETAILED DESCRIPTION OF THE INVENTION

Figure 1:
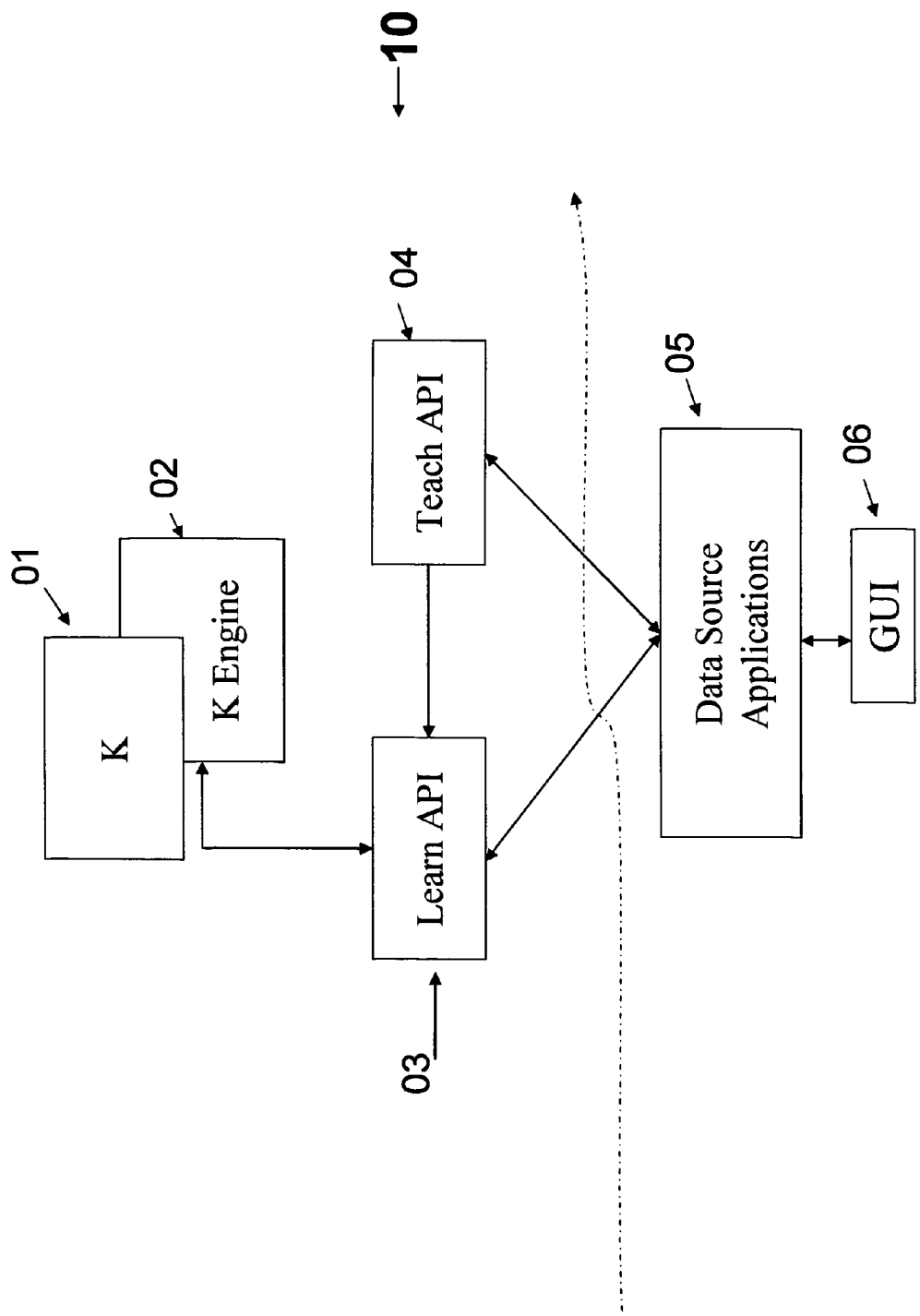
FIG. 1 shows a block diagram representation illustrating the interaction of the main components used in a preferred embodiment of the invention.

In the current embodiment, data coming into a KStore are learned, formed into a unique interlocking tree data store (K), and K nodes representing the relationships among the data may be constructed. Refer to FIG. 1. FIG. 1 shows a block diagram representation illustrating the interaction of the main components used in preferred embodiments of this invention. Generally, the KStore interlocking trees datastore, may typically be built into a relatively fixed structure using a resource called a K Engine 02. K Engine 02 may have a small set of rules it applies to data that has been particlized for it and sent to it, in order to support the K Engine 02 task of recording the particlized data as events in the KStore. The KStore itself may be accessed to answer queries about the data, preferably using resources called API Utilities. This is described in detail in the above referenced patents.

The size of a K may be a direct result of the number of K nodes required to record the data and the number of K nodes required may be directly related to the order and relationships of the incoming data. Because we anticipate working with large data sets with large amounts of data, the size of the K structure may be exceedingly large. Anything that can be done to reduce the size of K is important. In effect, this invention provides a method to reorder data and compress large amounts of data being loaded into the K Engine 02 through the Learn Engine 03. The data store which may be built after optimization may be compressed because it may have fewer K nodes and smaller as Result lists. By reducing the number of K nodes in the interlocking trees datastore, the data may be loaded faster, its size may be reduced, and because there are fewer nodes to traverse, it may be faster to query.

The optimization process may begin with a procedure which we refer to here as "Teach." Refer again to FIG. 1. "Teach" or "Teach Engine" 04 may be programmatically called, or initiated by any external data source application 05 through the use of a common API (application programming interface). Note also that Teach 04 may pass data back and forth programmatically to an application 05 and back and forth to Learn 03 through APIs. Note that in an alternative embodiment, Teach may exist in the application environment outside of the KStore System and call into the Learn Engine from outside the K environment.

Loading Data

In one embodiment, data that may be loaded by the K Engine may be formatted in .csv (comma separated value) format, such as data exported from Microsoft Excel. In another embodiment, the data may be loaded from XML or a message queue. However, those skilled in the art will understand that any other formats may be used. The data that comes in may be passed from a data source application 05 to either the Learn Engine 03 or to the Teach Engine 04.

To begin optimization, the Teach procedure may first determine if the data was previously optimized. In one embodiment, a special file containing information pertaining to how to optimize the incoming data may be present. If the file containing optimization information is present, then this existing optimization may be used in loading the data. If the data was not previously optimized or if it is determined that the optimization process should be performed again, the Teach procedure may open the data file and start counting the records. Within the Teach procedure, there may be a counter that is incremented as each record is read.

Depending on the size of the data set being read, as possibly determined by the above mentioned counter, the user may elect to sample just a portion of the data or all of the data set before the optimization process begins. For example, if the data set is extremely large (e.g. consisting of millions of records), the user may elect to stop reading in records when the number of records reaches 10,000. If however, the number of records is less than 10,000 for example, the user may set a parameter to load the entire data set before the optimization process begins.

As records are read or received by the Teach Engine they may be grouped into blocks. When a block is filled, the block may be passed to the Learn Engine 03. As taught in U.S. patent Ser. No. 10/879,329, entitled, "Functional operations for accessing and/or building interlocking trees datastores to enable their use with applications software," the Learn Engine provides an ability to receive or get data in various forms from various sources and to particlize the data such that the K Engine may process it. The Learn Engine basically provides interface, translation, and particlizing functions in order to provide the K Engine with particlized data to process. Thus, the Learn Engine may process appropriate protocol, transport, and translation capabilities to receive input from any expected data sources, whether they are XML, Oracle, DBMS or whatever, whether they are from static or streaming sources or even external event-triggered real-time sensor sources. Of course, the particular embodiment may be geared to any combination of such inputs. Learn may also be able to translate the data from such sources into appropriate sized chunks of data that may be readily particlized to fit with the expected data particle formatting for a KStore, and it may have a particlizer to send such particles to the K Engine, utilizing any buffering as may be appropriate.

As each record is passed to the Learn Engine 03, the Learn Engine 03 may particlize the data, and pass the particles to a K Engine to be processed into a K or interlocking trees data store 01.

Optimization

In a preferred embodiment, the optimization process uses the Learn Engine to "learn" either all, or a sub-set of the records, before the optimal order may be calculated. This optimal order may then be used to relearn the data already learned plus any new records. Using the above exemplary information, the user may decide that 10,000 data records (of a 1,000,000 record data set) may be learned before the optimal order may be determined.

The optimal order for loading data into a Learn Engine may be determined by a Teach Engine analytic using a KStore constructed from the sample data set. Note however that any other structures which help identify the number of fields and their distinct values may be used. The Teach Engine may first identify all of the fields used within the data. The analytic may then determine, preferably from a K, the number of unique values that exist for each specific field.

Refer to FIG. 2. FIG. 2 shows a set of five fictional sales activity records 20, which identify sales and invoice numbers for a single day for a furniture store salesman named Bill. These five records will be used to help illustrate the method of optimizing the size of a K data store.

Figure 3:
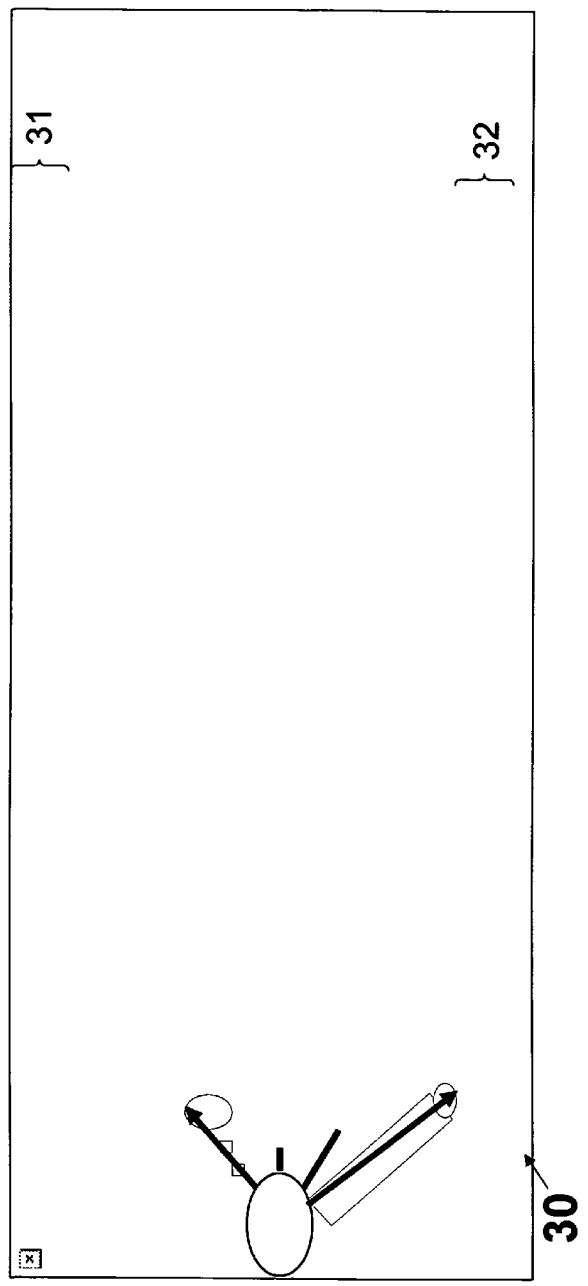
FIG. 3 shows a graphical representation of an interlocking trees datastore for the data from FIG. 2 before optimization.

In FIG. 2, the field, "salesperson," has only one value, "Bill" 21 in this data set. However, for the field "Invoice" 22, there are 5 values (invoice: 123, invoice: 124, invoice: 125, invoice: 126, and invoice: 127). FIG. 3 shows a data store that may be built for the sample data before optimization. Each record from FIG. 2 may be loaded and built into a K. For example, record 31 has six discrete individual K subcomponent nodes in the data store: "invoice: 123," "Tuesday," "Bill," "NJ," "TV," and "$125." Note that "BOT" refers to "beginning of thought" and "EOT" refers to "end of thought," which are explained in the above mentioned patents. Record 32 also has six discrete individual K subcomponent nodes: "invoice: 123," "Tuesday," "Bill," "NJ," "TV," and "$125." The entire data store based on this fictional data set loaded in this order may contain 30 individual discrete K subcomponent nodes (note that "BOT" node and "EOT" node are elemental root nodes and are not included in this count).

In the current embodiment, if the user chooses to optimize the date, the Teach Engine may run the optimization analytic. The analytic calculates the number of unique values for each field in the sample set of records (e.g. the first 10,000 records). Based on this calculation, a table or any other structure known to those skilled in the art, may be created which has all of the fields sorted from the field with the lowest number of unique values to the field with the highest number of unique values. For example, the following table shows how the fields in the above figure might be sorted from the lowest magnitude to the highest magnitude. Note that due to the small number of records in the data set, all the records were used for the optimization process.

| | Day of Week | Salesperson | Item | State | Sale amt. | Invoice number |
|---|---|---|---|---|---|---|
| Value | 1 | 1 | 1 | 1 | 3 | 5 |

Because all of the records occur on the same day of the week, "Tuesday," the number of unique field values for "Day of Week" in the table is "1". "Salesperson," "Item," and "State" also have the value "1" since there is only one unique value for each of those fields. Because there are three different discrete values for "Sale amt.", the value in the table for "Sale amt" is "3". There are five unique values for "Invoice number," therefore, the value in the table for "Invoice num" is "5". The table values, when sorted from lowest to highest, indicate an optimal load order. This means that K subcomponent nodes for fields with a value of 1 may be loaded into a K interlocking trees datastore only once. Those with higher numbers of unique field values may be loaded only the number of times corresponding to the unique number of field values. This may reduce the number of K nodes that may be constructed in the resulting interlocking trees datastore.

After optimization, the Teach Engine may store information about the optimal load order. This may be saved as metadata and may be saved in any manner known to those skilled in the art. If the data is ever re-loaded, the optimal order may be determined either by reusing the previously determined optimal order or the optimal order may be re-calculated. The Teach procedure may then reference the optimal load order information and begin loading the data into the Learn Engine field by field using the optimal load order determined during the optimization process.

The load order indicates which field to load first. For example in FIG. 4, "Tuesday" may be loaded first. Using an array or any other known structure, that may associate a field with a particular order in which it may be optimally loaded, the Teach Engine may use a transformation process to reorder the input fields prior to passing them to the Learn Engine. This transformation may utilize those processes known to those skilled in the art. One preferred embodiment uses indirect referencing. All of the data may then be loaded into K using the optimal order. The records that were 'learned' before the optimal order was determined may be deleted ('forgotten') before being learned optimally. The Teach Engine continues passing fields into the Learn Engine. The Teach Engine does not stop at 10,000 records as it did during pre-learning, but loads all of the data into K.

Figure 4:
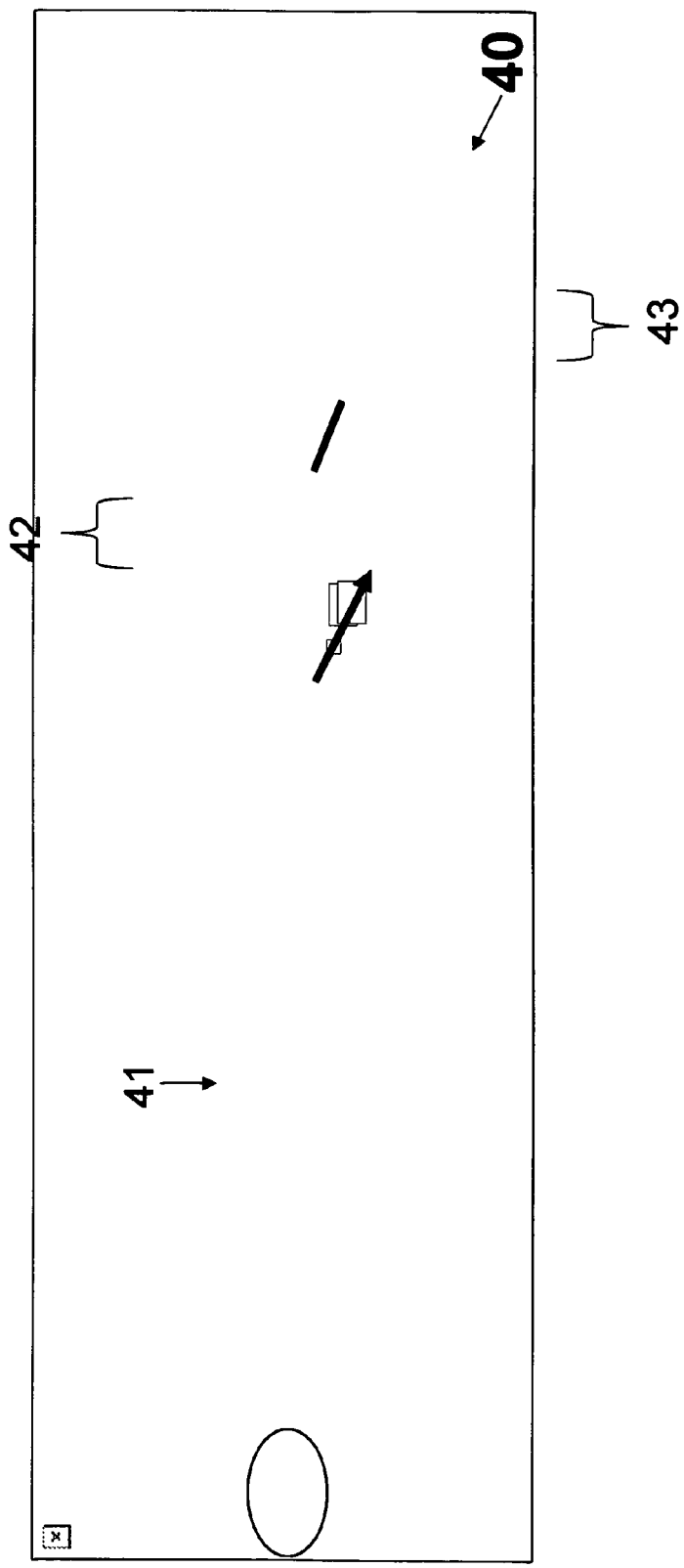
FIG. 4 shows a graphical representation of an interlocking trees datastore for the data from FIG. 2 after optimization.

FIG. 4 is an exemplary resulting data store 40 that may have been constructed after the Teach Engine optimized the sample data from FIG. 2. Because the data was optimized, salesperson "Bill" may be represented as a single K subcomponent node 41 in the interlocking tree data store, as might "Tuesday," "TV," and "NJ." "Amount" 42 has three K subcomponent nodes and "Invoice number" 43; has five separate discrete K subcomponent nodes in this exemplary K. After optimization the data store based on the fictional data set may now contain 12 K subcomponent nodes in contrast to 30 K subcomponent nodes in the data store before optimization. Those skilled in the art will appreciate that significant savings may be obtained by optimizing the load order for multi-gigabyte data sets common in traditional relational database systems. By reducing the number of K nodes in the interlocking trees datastore, the data may be loaded faster, its size may be reduced, and because there may be fewer K nodes to traverse, it may be faster to query.

While the invention has been described in detail and with reference to specific examples thereof, it will be apparent to one skilled in the art that various changes and modifications can be made therein without departing from the spirit and scope thereof.

We claim:

1. A method for optimizing construction of a KStore interlocking tree data store, comprising:
   providing a data set having a plurality of records with a plurality of fields;
   providing an optimization structure from a sample of said data set;
   analyzing said optimization structure to determine a field order for said plurality of records contained in said data set, wherein said analyzing of said optimization structure comprises obtaining analysis data from said optimization structure and providing a data structure to contain said analysis data;
   providing a KStore interlocking tree data store from said data set in accordance with said field order;
   recording a variable in said data structure representative of a number of differing field values in a field; and
   recording a plurality of variables in said data structure, each variable of said plurality of variables being representative of a number of differing field values in a respective field of said plurality of fields, wherein said fields of said plurality of fields have an initial order of fields within a record of said plurality of records further comprising determining a further order of fields differing from said initial order of fields in accordance with said plurality of variables.

2. The method for optimizing the construction of a KStore interlocking tree data store of claim 1, further comprising determining said further order of fields in accordance with magnitudes of respective variables of said plurality of variables.

3. The method for optimizing the construction of a KStore interlocking tree data store of claim 1, further comprising ordering said fields of said plurality of fields from a smallest magnitude to a largest magnitude of said respective variables of said plurality of variables.

4. The method for optimizing the construction of a KStore interlocking tree data store of claim 1, wherein providing said KStore comprises loading the fields of a record of said plurality of records into said KStore interlocking tree data store in said further order.

5. The method for optimizing the construction of a KStore interlocking tree data store of claim 1, wherein said further order is saved for use in relearning said data set.

6. The method for optimizing the construction of a KStore interlocking tree data store of claim 5, wherein providing said KStore interlocking tree data store comprises loading said plurality of fields of a record of said plurality of records into said KStore interlocking tree data store in said further order.

* * * * *